United States Patent Office 3,174,872
Patented Mar. 23, 1965

3,174,872
OXIDATION RESISTANT CARBON REFRACTORY ARTICLES
Joseph C. Fisher, Fostoria, and Lester L. Winter, Fairview Park, Ohio, assignors to Union Carbide Corporation, a corporation of New York
No Drawing. Filed Jan. 8, 1963, Ser. No. 250,024
9 Claims. (Cl. 106—56)

This invention relates to oxidation resistant refractory carbonaceous articles, and to a method for producing the same.

Refractory articles of carbon or graphite such as, for example, carbon brick used in lining furnaces, are conventionally made by mixing comminuted carbonaceous particles with a certain proportion of carbonaceous binder, molding the resultant mixture under pressure and heating the mold shape in an oven. When the bricks thus produced are employed in the lining of furnaces and in the presence of an oxidizing atmosphere, a continuous oxidation of the carbon bricks is experienced.

In the prior art, various expedients have been tried for applying protective films to carbonaceous articles to protect them against oxidation. One such coating consists of a ceramic glaze which is formed from a paste which is spread on to the carbonaceous article and fused to form the glaze. Unless the coating wets the carbonaceous surface and adheres thereto, it will crack. In addition, such coatings are subject to pinhole formation upon application. The presence of such flaws, of course, detracts from the ability of the coating to protect carbonaceous articles from oxidation. Furthermore, coatings of this type are fragile and chip or crack easily upon handling.

Another means of protection which has been attempted in the prior art is the impregnation of the article with a solution or melt such as boric acid. The protection thus afforded to the treated carbon article is limited by the amount of acid that can be introduced, and by its volatilization temperature. Impregnations with molten salts are complicated by the fact that few molten systems wet carbon or graphite, and still fewer can penetrate to a depth which will afford a significant degree of protection.

The direct addition of an oxidation protective agent into the initial carbonaceous mix represents another approach to this problem which is known in the art, and is the method by which this invention is practiced.

Specifically, the subject invention is based on the discovery that certain inorganic additives are much more effective than previously disclosed materials in providing carbonaceous articles with higher durability and greater ability to withstand the action of oxidizing conditions. These additives provide a film or glass on the carbon surface, which mechanically excludes oxygen therefrom.

The invention by means of which this result is attained consists in adding to a mixture of comminuted carbonaceous particles and a carbonaceous binder, prior to conventional forming operations, from about 6 percent to about 30 percent of one or more of the oxidation retardant additives which will hereinafter be fully detailed.

It has been found that certain metals and metallic oxides and in particular boron alone and boric oxide in conjunction with one or more additional materials chosen from the group consisting of the oxides of tin, of silicon, and of titanium, as well as sodium phosphate, in combination with calcium phosphate, aluminum phosphate or magnesium phosphate possess the above-indicated ability to form protective glasses on carbonaceous surfaces. Boron, under oxidizing conditions forms boric oxide which gives a carbonaceous surface a liquid glass film to protect it from oxidation. The residual unoxidized subsurface boron acts as a reservoir to replenish the boric oxide lost to vaporization. Boric oxide when employed alone is able to wet carbon and thus affords some protection. Boric oxide alone does not, however, give sufficient oxidation protection at high temperature because of its tendency to vaporize rapidly. It becomes so fluid that it tends to run off the articles leaving the surfaces exposed to oxidizing gases. To raise the viscosity and modify the tendency of the boric oxide to vaporize, one or more of the above materials is added to boric oxide. These multicomponent systems may form eutectics or solid solutions or combinations of these with solid components producing on the surface of the carbonaceous article a viscous self-sealing oxidation protective film of lower vapor pressure. These are obtained from a combination of oxidation retardant components whose melting points are greater than the carbon oxidation threshold temperature, but whose resultants melt depresses the melting points of the pure components to a temperature near the oxidation threshold temperature. As herein employed, the term "threshold temperature" is defined as the temperature at which carbon or graphite begins to oxidize noticeably or more specifically as the temperature at which carbon or graphite loses 1 percent by weight in 24 hours when exposed to oxidizing conditions. For carbon this temperature is approximately 400° C.

As examples of the successful practice of this invention, carbon bricks were prepared from the following mixture:

| "Green" Brick Composition, Percent | | Control, Percent | |
|---|---|---|---|
| Coke Flour | 55 | Coke | 77.5 |
| Pitch | 22.5 | Pitch | 22.5 |
| Melt | 22.5 | | |

The composition of the melt was 4 to 1 boric oxide-silicon dioxide. The mixtures thus formed were dry blended, and then molded under pressure and heat. The formed bricks were then baked to 1000° C. at 60° C. per hour rise, and held at this temperature for five hours and cooled. Oxidation tests were conducted on the finished bricks at 1000° C. in a muffle furnace with a natural flow of air through the furnace.

In evaluating the beneficial effects of the instant treatment, a convenient standard employed was "protective life" or the ratio of the time required for a 10 percent weight loss of the treated brick to the time required for a similar weight loss of the control brick. In defining this standard, the figure of 10 percent was arbitrarily chosen. Some glasses at this weight loss level do not show superior results over $B_2O_3$, but do so at 20 percent and 30 percent weight loss levels, owing to their slow film formation. This is particularly true of the later-mentioned $Ca_3(PO_4)_2$—$(NaPO_3)_6$·$B_2O_3$ system.

It was found that the increase in protective life of the above-discussed boric oxide-silicon dioxide protected brick was 38 times that of a brick devoid of the additive of the invention. Testing this system for protection at various temperatures gave the following results shown in Table I.

TABLE I

| Temperature, ° C. | Protective Life Oxidation Period for a 10% Weight Loss at 1,000° C., Hours | |
|---|---|---|
| | Treated | Control |
| 650 | 10 | 0.7 |
| 800 | 200 | 0.8 |
| 900 | 80 | 1.0 |
| 1,000 | 38 | 1.0 |

A range of $B_2O_3$—$SiO_2$ ratios exists, which provides ample protection against oxidation. This range is indicated in Table II below, and was obtained in the same manner as in the previous example.

TABLE II

| Melt Composition, Percent | | Ratio $B_2O_3/SiO_2$ | Protective Life Oxidation Period for a 10% weight loss at 1,000° C., Hours |
|---|---|---|---|
| $B_2O_3$ | $SiO_2$ | | |
| (1) | (1) | (1) | 1.0 |
| 100 | 0 | ---------- | 1.2 |
| 95 | 5 | 19/1 | 31.6 |
| 90 | 10 | 9/1 | 36.0 |
| 80 | 20 | 4/1 | 38.2 |
| 70 | 30 | 7/3 | 8.7 |
| 60 | 40 | 3/2 | 2.1 |

[1] Control.

Examination of Table II indicates that glasses having a silica content greater than 20 percent lose some of their ability to wet carbon, and consequently their protective ability is decreased. This failure to fully wet carbon is demonstrated by the appearance of the film on the carbon surface, which film tends to pull apart and expose the carbon surface. However, such high silica additives still give an increased measure of protection when compared to the use of boric oxide alone.

The action of $B_2O_3$—$TiO_2$ and $B_2O_3$—$SnO_2$ in similar ratios has been found to be substantially the same. The preferred ratios for these materials are generally the same as is the case with $B_2O_3$—$SiO_2$.

Table III shows the increase in life with 22.5 and 30 percent melt substitution in a mixture similar to the above-mentioned and includes other oxidation retardant additives.

TABLE III

| Melt Composition | | Percent Melt in Green Brick Composition (pitch) | Protective-Life-Oxidation Period for a Given Percent Weight Loss at 1,000° C., Hours | | |
|---|---|---|---|---|---|
| Components | Proportions | | 10% | 20% | 30% |
| Control | ---------- | 22.5 | 1.0 | 1.8 | ---------- |
| $B_2O_3$ only | ---------- | 22.5 | 1.8 | 4.0 | 8.0 |
| $B_2O_3$-$SiO_2$ | 4-1 | 22.5 | 38.2 | 44.0 | ---------- |
| $B_2O_3$-$TiO_2$ | 9-1 | 22.5 | 25.0 | 42.0 | ---------- |
| $B_2O_3$-$TiO_2$ | 9-1 | 30.0 | 7.0 | ---------- | ---------- |
| $B_2O_3$-$SnO_2$ | 9-1 | 22.5 | 18.0 | 28.0 | ---------- |
| $B_2O_3$-$SnO_2$ | 9-1 | 30.0 | 7.0 | ---------- | ---------- |
| $B_2O_3$-$Ca_3(PO_4)_2$-$(NaPO_3)_6$ | 10-7-3 | 22.5 | 2.0 | 6.0 | 17.0 |
| $B_2O_3$-$Mg_3(PO_4)_2$-$(NaPO_3)_6$ | 10-6-4 | 22.5 | 10.0 | 23.0 | ---------- |

The 1–1 proportions given for $B_2O_3$-phosphate glass in Table III of the application (shown above as 10–7–3 and 10–6–4 proportions) are based on the following preparation of these glasses. Calcium or magnesium phosphate is initially fused in the proportion shown above with sodium hexametaphosphate, which acts as a flux, cooled, and pulverized. The phosphate glass is then added to boric oxide flour in a ratio of 1 part $B_2O_3$ to 1 part phosphate glass.

In the following systems, sodium pyrophosphate is also used as a fluxing agent to form the initial glass prior to addition of the phosphates to $B_2O_3$. In the following tables, the brick composition shown is 55.0 percent coke, 22.5 percent pitch and 22.5 percent additive melt.

TABLE IV

System $Mg_3(PO_4)_2$—$Na_4P_2O_7$—$B_2O_3$

Green brick composition: Percent
Coke ............................................................ 55.0
Pitch ............................................................ 22.5
Melt ............................................................ 22.5

| Melt Compositions, percent | | | Protective Life-Oxidation Period Required for a 10% Weight Loss at 1,000° C., Hours |
|---|---|---|---|
| $Mg_3(PO_4)_2$ | $Na_4P_2O_7$ | $B_2O_3$ | |
| (1) | (1) | (1) | 1.0 |
| 33.3 | 33.3 | 33.3 | 4.0 |
| 20 | 20 | 60.0 | 15.5 |
| 10 | 10 | 80.0 | 20.0 |
| 5 | 5 | 90.0 | 20.0 |

[1] Control.

TABLE V

System $Ca_3(PO_4)_2$—$Na_4P_2O_7$—$B_2O_3$

| Melt Compositions, Percent | | | Protective Life Oxidation Period Required for a 10% Weight Loss at 1,000° C., Hours |
|---|---|---|---|
| $Ca_3(PO_4)_2$ | $Na_4P_2O_7$ | $B_2O_3$ | |
| (1) | (1) | (1) | 1.0 |
| 33.3 | 33.3 | 33.3 | 3.5 |
| 20 | 20 | 60.0 | 16.0 |
| 10 | 10 | 80.0 | 22.0 |
| 5 | 5 | 90.0 | 24.5 |

[1] Control.

TABLE VI

System $AlPO_4$—$Na_4P_2O_7$—$B_2O_3$

| Melt Compositions, Percent | | | Protective Life Oxidation Period Required for a 10% Weight Loss at 1,000° C., Hours |
|---|---|---|---|
| $AlPO_4$ | $Na_4P_2O_7$ | $B_2O_3$ | |
| (1) | (1) | (1) | 1.0 |
| 25 | 25 | 50 | 17.0 |
| 15 | 15 | 70 | 27.0 |
| 10 | 10 | 80 | 14.0 |
| 5 | 5 | 90 | 23.0 |

[1] Control.

It will be observed for any of the above three immediate systems in Tables IV, V, and VI, that considering phosphate a single component, protection is provided over a boric oxide to phosphate range of from ½:1 to 9:1.

As a further example of the practice of this invention, the oxidation of carbon articles was retarded by the substitution of boron for carbon in carbon-pitch mixes with the following results shown in Table VII. The control employed having no boron therein was composed of 77.5 percent coke flour and 22.5 percent pitch.

TABLE VII

| Composition Green Brick, percent | | | Protective Life Oxidation Period for a 10% Weight Loss at 1,000° C., Hours |
|---|---|---|---|
| Coke | Pitch | Boron | |
| 77.5 | 22.5 | 0 | 1.0 |
| 71.5 | 22.5 | 6 | 2.8 |
| 69.5 | 22.5 | 8 | 8.8 |
| 67.5 | 22.5 | 10 | 45.0 |
| 62.5 | 22.5 | 15 | 66.2 |
| 57.5 | 22.5 | 20 | 105.0 |

While the invention has been described with particular reference to the manufacturing of carbon bricks, the invention is not limited thereto, but its method is equally applicable to many other refractory articles ordinarily produced from carbon. Similarly, coal may be used instead of coke as part of the carbon ingredients in the green mix. Additionally, the glass-containing mix may be extruded as well as molded.

It is thought that the mode of operation of this invention is based upon the use of additives in an amount sufficient to provide oxidation retardation, but not such as to prevent the carbon constituent from losing its bonding characteristics, as manifested for example by loss in mechanical strength of the formed article at elevated temperature. It is believed that the non-carbonaceous additive remains uniformly distributed throughout the formed article regardless of its physical condition or shape in service.

This application is a continuation-in-part of co-pending application, Serial No. 598,249, filed July 17, 1956, which in turn was a continuation-in-part of Serial No. 505,830, filed May 3, 1955, both of which are now abandoned.

We claim:

1. An oxidation resistant refractory article composed of a carbonaceous material and containing uniformaly distributed throughout and on the surface thereof a protective glass-forming additive which when baked will mechanically exclude oxygen from said surface, said glass forming additive comprising at least one member selected from the group consisting of boron, mixtures of boric oxide and silicon dioxide; mixtures of boric oxide and tin oxide; mixtures of boric oxide and titanium dioxide; mixtures of boric oxide, sodium phosphate, and calcium phosphate; mixtures of boric oxide, sodium phosphate and aluminum phosphate; and mixtures of boric oxide, sodium phosphate and magnesium phosphate; wherein the weight of said boric oxide in said mixtures being from one half to nineteen times the weight of the other constituents of said mixtures; the total amount of said glass-forming additive ranging from 6 to 30 weight percent of said article.

2. The article of claim 1 wherein said additive is boron.

3. The article of claim 1 wherein said glass-forming additive comprises boric oxide and titanium dioxide in a weight ratio of 9 to 1.

4. The article of claim 1 wherein said glass-forming additive comprises boric oxide and tin oxide in a weight ratio of 9 to 1.

5. The article of claim 1 wherein said glass-forming additive comprises boric oxide and silicon dioxide in a weight ratio which is from 4 to 1 and 19 to 1.

6. The article of claim 1 wherein said glass-forming additive comprises boric oxide, sodium phosphate and calcium phosphate and wherein the weight ratio of boric oxide to phosphate materials is from ½:1 to 10:1.

7. The article of claim 1 wherein said glass-forming additive comprises boric oxide, sodium phosphate and aluminum phosphate and wherein the weight ratio of boric oxide to phosphate containing materials is from ½:1 to 10:1.

8. The article of claim 1 wherein said glass-forming additive comprises boric oxide, sodium phosphate and magnesium phosphate and wherein the weight ratio of boric oxide to phosphate containing materials is ½:1 to 10:1.

9. A method of making oxidation resistant carbon articles which comprises blending comminuted carbonaceous particles, and a pitch binder in a weight ratio of about 2 to 1, with a glass-forming additive selected from the group consisting of boron, mixtures of boric oxide and silicon dioxide; mixtures of boric oxide and tin oxide; mixtures of boric oxide and titanium dioxide; mixtures of boric oxide, sodium phosphate and calcium phosphate; mixtures of boric oxide, sodium phosphate and aluminum phosphate; and mixtures of boric oxide, sodium phosphate and magnesium phosphate; wherein the weight of boric oxide in said mixtures is from ½ to 19 times the weight of the other constituents of said mixtures; the total amount of said glass-forming additive ranging from 6 to 30 weight percent of the blend; shaping the resulting blend into the desired form and baking the shaped form to provide a protective glass throughout said article and on the surface thereof.

References Cited in the file of this patent

UNITED STATES PATENTS 2,422,215   Amberg et al. _____ June 17, 1947